US012676309B2

(12) United States Patent
Kojima et al.

(10) Patent No.: US 12,676,309 B2
(45) Date of Patent: Jul. 7, 2026

(54) NEGATIVE ELECTRODE AND NONAQUEOUS ELECTROLYTE SECONDARY BATTERY

(71) Applicant: Prime Planet Energy & Solutions, Inc., Tokyo (JP)

(72) Inventors: Yurika Kojima, Kobe (JP); Yuki Morikawa, Kobe (JP); Naoto Onodera, Kobe (JP); Kouhei Tsuzuki, Kobe (JP); Hideki Sano, Ikeda (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 565 days.

(21) Appl. No.: 18/317,927

(22) Filed: May 16, 2023

(65) Prior Publication Data

US 2023/0387410 A1 Nov. 30, 2023

(30) Foreign Application Priority Data

May 30, 2022 (JP) ................................. 2022-087491

(51) Int. Cl.
| | |
|---|---|
| *H01M 4/583* | (2010.01) |
| *H01M 4/38* | (2006.01) |
| *H01M 4/62* | (2006.01) |
| *H01M 10/0525* | (2010.01) |
| *H01M 4/02* | (2006.01) |

(52) U.S. Cl.
CPC ........... *H01M 4/583* (2013.01); *H01M 4/386* (2013.01); *H01M 4/622* (2013.01); *H01M 4/625* (2013.01); *H01M 10/0525* (2013.01); *H01M 2004/027* (2013.01)

(58) Field of Classification Search
CPC ...... H01M 4/583; H01M 4/386; H01M 4/622; H01M 4/625; H01M 10/0525; H01M 2004/027; H01M 4/133; H01M 4/134; H01M 4/587; H01M 10/05; H01M 4/13; H01M 4/366; H01M 4/621; Y02E 60/10
See application file for complete search history.

(56) References Cited

U.S. PATENT DOCUMENTS

| | | | |
|---|---|---|---|
| 2014/0212762 A1* | 7/2014 | Nakamura ............ | H01M 4/587 252/502 |
| 2019/0115585 A1* | 4/2019 | Tsujiko ................. | H01M 4/483 |
| 2020/0091559 A1* | 3/2020 | Noguchi ........... | H01M 10/0568 |
| 2020/0106101 A1* | 4/2020 | Oyama ................. | H01M 4/621 |
| 2020/0388846 A1* | 12/2020 | Kim ...................... | H01M 4/134 |

FOREIGN PATENT DOCUMENTS

JP 2019-075199 A 5/2019

* cited by examiner

*Primary Examiner* — Daniel H Lee
(74) *Attorney, Agent, or Firm* — HAUPTMAN HAM, LLP

(57) ABSTRACT

The herein disclosed negative electrode is a negative electrode for a nonaqueous electrolyte secondary battery that includes a current collector, and a negative electrode active material layer disposed on a single surface or both surfaces of the current collector. The negative electrode active material layer includes a negative electrode active material and a binder. A graphite particle and a Si-containing particle are included as the negative electrode active material. A carboxymethyl cellulose (CMC), a poly acrylic acid (PAA), and a styrene butadiene rubber (SBR) are included as the binder. A spring constant in a thickness direction of the negative electrode is equal to or more than 70 kN/mm and not more than 400 kN/mm, and a yield loop height on a stiffness test is equal to or less than 13 mm.

9 Claims, 3 Drawing Sheets

NEGATIVE ELECTRODE AND NONAQUEOUS ELECTROLYTE SECONDARY BATTERY

CROSS REFERENCE TO RELATED APPLICATIONS

The present application claims the priority based on Japanese Patent Application No. 2022-087491 filed on May 30, 2022, the entire contents of which are incorporated in the present specification by reference.

BACKGROUND

The present disclosure relates to a negative electrode and a nonaqueous electrolyte secondary battery.

In general, regarding a negative electrode used for a nonaqueous electrolyte secondary battery, a graphite is used as a negative electrode active material. Recently, in order to implement making the secondary battery have a high capacity, it is discussed to use a Si-containing particle (for example, silicon oxide) as the negative electrode active material. For example, Japanese Patent Application Publication No. 2019-75199 discloses a negative electrode plate that includes a graphite particle, an amorphous carbon material, and a silicon oxide. This negative electrode plate is expected, by having a spring constant being equal to or more than 700 kN/mm and not more than 3000 kN/mm, to be capable of having a rigidity that can be resistant to swell and contraction of the silicon oxide.

SUMMARY

In general, the Si-containing particle has a specific capacity larger than the graphite, but has a higher swell rate at an electrically charging time. Thus, the negative electrode including the Si-containing particle tends to easily swell due to repeating charge and discharge. If the negative electrode swells, it is possible to cause a malfunction that degradation of the other member in the battery proceeds earlier, or the like, because, for example, an electrically conductive path in the negative electrode tends to become easily broken, and a reaction force to a restriction pressure of the battery is increased. On the other hand, if a rigidity of the negative electrode is enhanced in order to decrease the swell of the negative electrode, the swell stress of the negative electrode active material might become high. By doing this, there is a fear that cracks or the like may occur on the negative electrode active material and thus a capacity maintenance rate may be reduced.

The present disclosure has been made in view of the above-described circumstances, and a main object is to provide a negative electrode in which the swell caused by repeating charge and discharge can be suppressed and in which an outstanding capacity maintenance rate is implemented. In addition, another object is to provide a nonaqueous electrolyte secondary battery that includes the above described negative electrode.

In order to solve the above described problems, a negative electrode whose rigidity is high (spring constant is high) and which is easily elongated is provided by the present disclosure. By making the negative electrode have the high rigidity, it is possible to suppress the swell of the negative electrode caused by repeating charge and discharge. Furthermore, by making the negative electrode be easily elongated, it is possible to mitigate the swell stress of the negative electrode active material caused by charge and discharge. As the result, cracks or the like of the negative electrode active material can be suppressed, and thus it is possible to implement both suppressing the swell of the negative electrode and obtaining an outstanding capacity maintenance rate.

The herein disclosed negative electrode is a negative electrode for a nonaqueous electrolyte secondary battery that includes a current collector and a negative electrode active material layer formed on a single surface or both surfaces of the current collector. The negative electrode active material layer includes a negative electrode active material and a binder. As the negative electrode active material, a graphite particle and a Si-containing particle are included. As the binder, a carboxymethyl cellulose (CMC), a poly acrylic acid (PAA), and a styrene butadiene rubber (SBR) are included. A spring constant in a thickness direction of the negative electrode is equal to or more than 70 kN/mm and not more than 400 kN/mm. A negative electrode plate is prepared which includes the negative electrode active material layer on a single surface of the current collector. With respect to a loop-shaped sample whose outer circumference is 80 mm and which is obtained by rounding the negative electrode plate in a single fold to make the outer circumference surface be the negative electrode active material layer, on a correlation graph for a stress of the sample and for a loop height of the sample which are obtained when an outer circumference surface of the sample is pressed, a yield loop height is equal to or less than 13 mm, the yield loop height being the loop height corresponding to a first inflexion point at which the stress is reduced after being substantially and continuously risen.

In addition, the present disclosure provides a nonaqueous electrolyte secondary battery. The herein disclosed nonaqueous electrolyte secondary battery includes an electrode assembly provided with a positive electrode and a negative electrode, and includes a nonaqueous electrolyte. This negative electrode is the herein disclosed negative electrode.

By doing this, a nonaqueous electrolyte secondary battery is provided in which suppressing the swell of the negative electrode caused by repeat of charge and discharge and obtaining the outstanding capacity maintenance rate are implemented.

DETAILED DESCRIPTION

Below, a herein disclosed technique will be described in detail. The matters other than matters particularly mentioned in this specification, which are matters required for executing the present technique, can be grasped as design matters of those skilled in the art based on the related art in the present field. Contents of the herein disclosed technique can be executed based on the contents disclosed in the present specification, and the technical common sense in the present field.

Incidentally, each figure is schematically drawn, and thus a dimensional relation (such as length, width, and thickness) might not always reflect an actual dimensional relation. Additionally, in figures described below, members/parts providing the same effect are given the same numerals and signs, and overlapped explanations might be omitted or simplified.

Additionally, in the present specification, when a numerical value range is represented by "A to B (here, A and B are arbitrary values)", it means "equal to or more than A and not more than B" and furthermore semantically covers meanings of "exceeding A and less than B", "exceeding A and not more than B", and "equal to or more than A and less than B".

In the present specification, the "battery" is a term widely denoting an electric storage device from which an electric energy can be taken out, and is a concept containing a primary battery and a secondary battery. Additionally, in the present specification, the "secondary battery" is a term widely denoting an electric storage device capable of repeatedly charging and discharging, and is a concept containing so called storage batteries (chemical batteries), such as a lithium ion secondary battery and a nickel hydrogen battery, and containing capacitors (physical batteries), such as an electric double layer capacitor.

Figure 1:
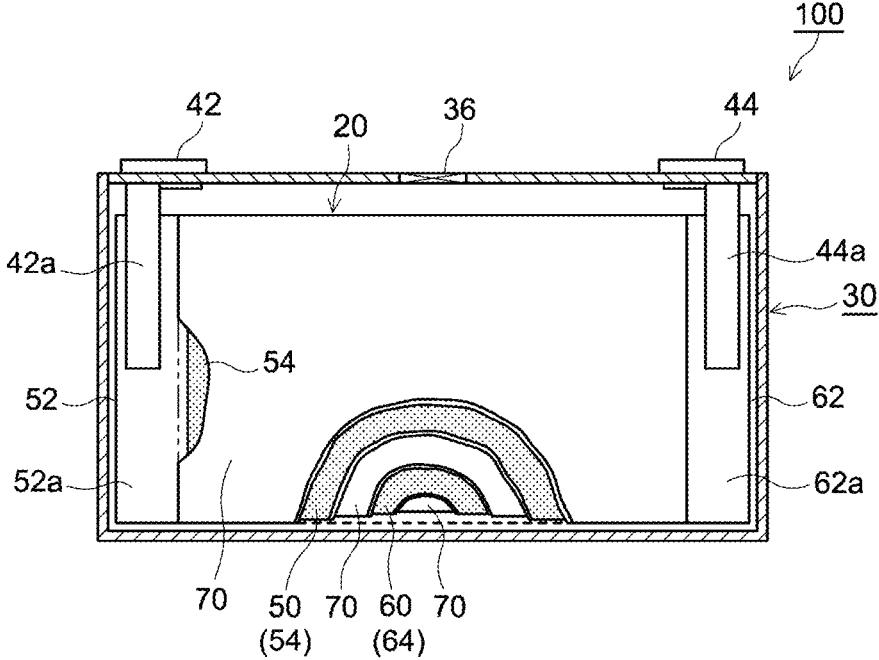
FIG. 1 is a cross section view that schematically shows a configuration of a nonaqueous electrolyte secondary battery in accordance with one embodiment.

FIG. 1 is a cross section view that schematically shows a configuration of a nonaqueous electrolyte secondary battery 100 in accordance with one embodiment. The nonaqueous electrolyte secondary battery 100 is a sealed battery, formed in a square shape, which is constructed with a flat-shaped electrode assembly (wound electrode assembly) 20 and a nonaqueous electrolyte (not shown) accommodated inside a battery case 30. Here, the nonaqueous electrolyte secondary battery 100 is a lithium ion secondary battery. The battery case 30 includes a positive electrode terminal 42 and a negative electrode terminal 44 which are for outside connection. In addition, a thin-walled safety valve 36 is provided, which is set to release an internal pressure of the battery case 30 when the internal pressure rises to be equal to or more than a predetermined level. Furthermore, the battery case 30 is provided with an injection port (not shown) for injecting the nonaqueous electrolyte. It is preferable that a material of the battery case 30 is a metal material having a high strength, lightweight, and good thermal conductivity. As such a metal material, it is possible to use, for example, aluminum, steel, or the like.

Figure 2:
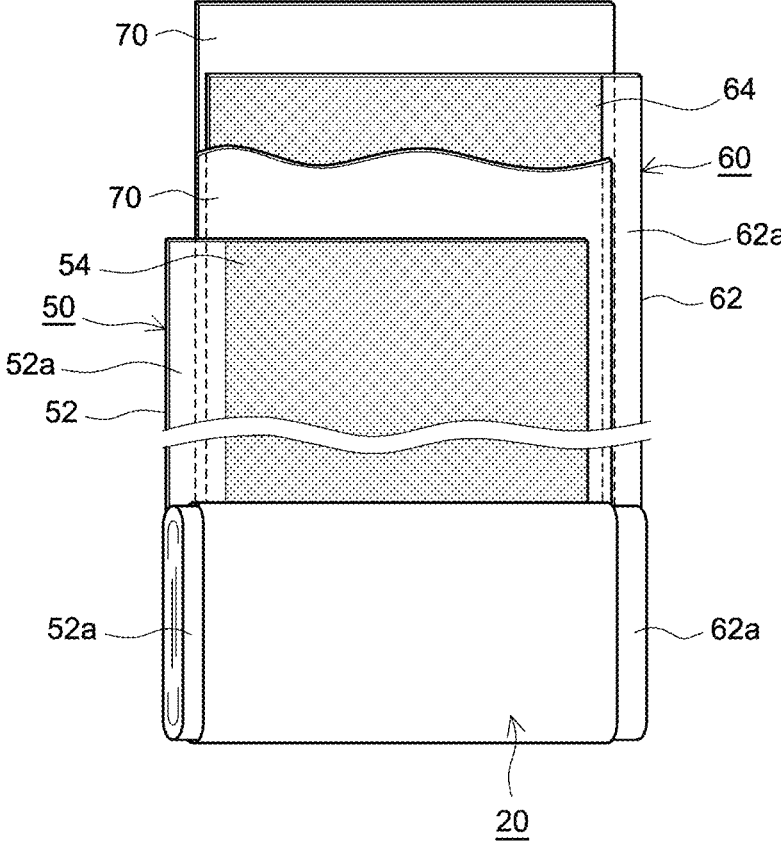
FIG. 2 is an exploded view that schematically shows a configuration of an electrode assembly of the nonaqueous electrolyte secondary battery in accordance with one embodiment.

FIG. 2 is an exploded view that schematically shows a configuration of the electrode assembly 20 of the nonaqueous electrolyte secondary battery 100 in accordance with one embodiment. In FIG. 2, the electrode assembly 20 is a wound electrode assembly that is configured with a long sheet-shaped positive electrode 50 and a long sheet-shaped negative electrode 60, which are laminated via 2 pieces of long sheet-shaped separators 70 and then wound therein with a winding axis treated as a center. The positive electrode 50 includes a positive electrode collecting body 52 and positive electrode active material layers 54 formed on both surfaces of the positive electrode collecting body 52 in a longitudinal side direction. At one edge part of the positive electrode collecting body 52 in a winding axis direction (in other words, sheet width direction orthogonal to the longitudinal side direction), a portion where the positive electrode active material layer 54 is not formed in a strip-like shape along the edge part and thus the positive electrode collecting body 52 is exposed (in other words, positive electrode collecting body exposed part 52a) is provided. The negative electrode 60 includes a negative electrode collecting body 62, and a negative electrode active material layer 64 formed on a single surface or both surfaces (here, both surfaces) of the negative electrode collecting body 62 in the longitudinal side direction. At the other edge part in the winding axis direction of the negative electrode collecting body 62, a portion where the negative electrode active material layer 64 is not formed in a strip-like shape along the edge part and thus the negative electrode collecting body 62 is exposed (in other words, negative electrode collecting body exposed part 62a) is provided. A positive electrode collecting plate 42a is joined to the positive electrode collecting body exposed part 52a, and a negative electrode collecting plate 44a is joined to the negative electrode collecting body exposed part 62a (see FIG. 1). The positive electrode collecting plate 42a is electrically connected to the positive electrode terminal 42 used for outside connection, and is configured to implement conduction between the inside and the outside of the battery case 30. Similarly, the negative electrode collecting plate 44a is electrically connected to the negative electrode terminal 44 used for outside connection, and is configured to implement conduction between the inside and the outside of the battery case 30 (see FIG. 1). Incidentally, between the positive electrode terminal 42 and the positive electrode collecting plate 42a, or between the negative electrode terminal 44 and the negative electrode collecting plate 44a, a current interruption device (CID) might be disposed.

As the positive electrode collecting body 52 configuring the positive electrode 50, it is possible to use, for example, aluminum foil, or the like. The positive electrode active material layer 54 contains a positive electrode active material. As the positive electrode active material, it is possible to use a well known positive electrode active material being used for a lithium ion secondary battery, and to use, for example, a lithium composite metal oxide having a layer shaped structure, a spinel structure, an olivine structure, or the like (for example, $LiNi_{1/3}Co_{1/3}Mn_{1/3}O_2$, $LiNiO_2$, $LiCoO_2$, $LiFeO_2$, $LiMn_2O_4$, $LiNi_{0.5}Mn_{1.5}O_4$, $LiCrMnO_4$, $LiFePO_4$, or the like). In addition, the positive electrode active material layer 54 might contain a conductive material, a binder, or the like. As the conductive material, it is possible to suitably use, for example, a carbon black, such as acetylene black (AB), or the other carbon material (graphite, or the like). As the binder, it is possible to use, for example, polyvinylidene fluoride (PVDF), or the like.

The positive electrode active material layer 54 can be formed by dispersing the positive electrode active material and materials used as needed (conductive material, binder, or the like) in a suitable solvent (for example, N-methyl-2-pyrrolidone: NMP), by preparing a paste like (or slurry like) composition (positive electrode mix paste), by applying a suitable amount of this composition onto a surface of the positive electrode collecting body 52 to coat, and by drying the resultant.

As the separator 70, it is possible to use various fine porous sheets, similar to conventional ones, and to use, for example, a fine porous resin sheet consisted of a resin, such as polyethylene (PE) and polypropylene (PP). This kind of fine porous resin sheet might be configured with a single-layer structure, or might be configured with a multi-layer structure having two or more layers (for example, three-layer structure in which PP layers are laminated on both surfaces of a PE layer). In addition, the separator 70 might include a heat resistant layer (HRL).

As the nonaqueous electrolyte, it is possible to use one similar to conventional one, and to use, for example, a nonaqueous electrolyte that a supporting salt is contained in an organic solvent (nonaqueous solvent). As the nonaqueous solvent, it is possible to use an aprotic solvent, such as carbonates, esters, and ethers. Among them, it is possible to suitably use the carbonates, for example, ethylene carbonate (EC), diethyl carbonate (DEC), dimethyl carbonate (DMC), ethyl methyl carbonate (EMC), or the like. Alternatively, it is possible to preferably use a fluorine type solvent, such as fluorinated carbonates, for example, monofluoroethylene carbonate (MFEC), difluoroethylene carbonate (DFEC), monofluoromethyl difluoromethyl carbonate (F-DMC), trifluoro dimethyl carbonate (TFDMC), or the like. Regarding this kind of nonaqueous solvent, it is possible to use single one with 1 kind, or suitable combination of 2 or more kinds. As the supporting salt, it is possible to suitably use a lithium salt, for example, $LiPF_6$, $LiBF_4$, $LiClO_4$, or the like. It is preferable that a concentration of the supporting salt, which is not particularly restricted, is equal to or more than about 0.7 mol/L and not more than about 1.3 mol/L.

Incidentally, the nonaqueous electrolyte might contain a component other than the above described nonaqueous solvent and supporting salt, unless effects of the present technique are significantly spoiled, and the nonaqueous electrolyte might contain various additive agents, for example, a gas generating agent, a coating-film forming agent, a dispersing agent, a thickening agent, or the like.

Below, the herein disclosed negative electrode 60 will be described. The negative electrode 60 includes the negative electrode collecting body 62, and the negative electrode active material layer 64 formed on the surface of the negative electrode collecting body 62. The negative electrode active material layer 64 can be formed on the single surface or both surfaces of the negative electrode collecting body 62. The negative electrode active material layer 64 includes a graphite particle and a Si-containing particle, as the negative electrode active material. In general, the Si-containing particle has a higher swell rate caused by charge than the graphite particle. Thus, by repeating charge and discharge, the whole negative electrode becomes to easily swell. Thus, from a perspective of suppressing the swell of the negative electrode, the present disclosure provides a negative electrode having a rigidity for suppressing the swell of the negative electrode active material containing the Si-containing particle and having an elongation easiness for mitigating the stress at the swell time of the negative electrode active material.

As the negative electrode collecting body 62, it is possible to use a conventionally known one, and to use a sheet-shaped or foil-shaped body, made of a metal, for example, copper, nickel, titanium, stainless steel, or the like. In a case where a copper foil is used as the negative electrode collecting body 62, an average thickness of it, which is not particularly restricted, might be, for example, equal to or more than 5 μm and not more than 30 μm, preferably equal to or more than 5 μm and not more than 20 μm, or further preferably equal to or more than 5 μm and not more than 15 μm.

The negative electrode active material layer 64 includes at least the negative electrode active material and the binder. In addition, the negative electrode active material layer 64 might contain the other component, such as a conductive material and a thickening agent, as needed.

The negative electrode active material layer 64 contains the graphite particle and the Si-containing particle, as the negative electrode active material. The negative electrode active material might be configured with the graphite particle and the Si-containing particle.

As the graphite particle, it is possible to use, for example, an artificial graphite, a natural graphite, or the like. The graphite particle might include a coating layer of amorphous carbon on the surface.

An average particle diameter ($D_{50}$ particle diameter) of the graphite particle might be, for example, equal to or more than 8 μm and not more than 30 μm, or might be equal to or more than 12 μm and not more than 24 μm. In addition, although not particularly restricted, a value ($D_{90}/D_{10}$) in which a $D_{90}$ particle diameter of the graphite particle is divided by a $D_{10}$ particle diameter of the graphite particle might be equal to or more than 3. An upper limit of the $D_{90}/D_{10}$ might be, for example, equal to or less than 10.

In the present specification, the wording "average particle diameter" means a particle diameter ($D_{50}$ particle diameter) corresponding to cumulative 50% from a microparticle side, in a particle size distribution on a volume basis measured by a particle size distribution measurement based on a laser diffraction/light scattering method. In addition, the wording "$D_{10}$ particle diameter" means a particle diameter corresponding to cumulative 10% from the microparticle side, in the above described particle size distribution. In addition, the wording "$D_{90}$ particle diameter" means a particle diameter corresponding to cumulative 90% from the microparticle side, in the above described particle size distribution.

A BET specific surface area of the graphite particle is, for example, equal to or more than 0.5 $m^2/g$, might be equal to or more than 0.7 $m^2/g$, or might be equal to or more than 1 $m^2/g$. In addition, an upper limit of the BET specific surface area of the graphite particle is, for example, equal to or less than 3.5 $m^2/g$, might be equal to or less than 2.5 $m^2/g$, or might be equal to or less than 2 $m^2/g$.

Incidentally, in the present specification, the wording "BET specific surface area" means a value measured by a constant capacity type adsorbent method with using a commercially available specific surface area measuring apparatus (for example, Macsorb Model-1208 (made by Mountech Co., Ltd.)) and using nitrogen as the adsorbate gas.

Although the particle strength of the graphite particle is not particularly restricted, the average 10% yield strength of the graphite particle is preferably equal to or more than 12 MPa and not more than 20 MPa, or might be, for example, equal to or more than 13 MPa and not more than 17 MPa. If the average 10% yield strength is within the within the above described range, it becomes easy to properly adjust the spring constant of the negative electrode 60, and therefore a balance of the rigidity and elongation easiness can be adjusted suitably.

Incidentally, in the present specification, the wording "10% yield strength" means a pressure when a single particle is subjected to a 10% compression, by using a microscopic compression testing machine (device name: MCT-211, made by Shimadzu Corporation) to compress the single particle from a gravity direction. Additionally, the wording "average 10% yield strength" in the present specification means an arithmetical mean of the 10% yield strengths of at least 10 particles.

In a case where a total of the graphite particle and the Si-containing particle is treated as 100 wt %, it is suitable that a rate of the graphite particle is, for example, equal to or more than 80 wt %, or it is preferable that the rate of the graphite particle is equal to or more than 90 wt %. In addition, it is suitable that the rate of the graphite particle is, for example, equal to or less than 97 wt %, or it is preferable that the rate of the graphite particle is equal to or less than wt %. If the rate of the graphite particle is too high, a rate of the Si-containing particle is decreased and thus a capacity of the negative electrode 60 may happen to become smaller.

The Si-containing particle is a particle that contains silicon (Si) capable of reversibly storing and releasing a charge carrier (which might be a lithium ion in a lithium ion secondary battery). As the Si-containing particle, it is possible to use, for example, a Si particle, a silicon oxide particle represented by SiOx (0.05<x<1.95), a Si—C composite, or the like. The silicon oxide particle might contain the other element, and it is possible as the other element to contain, for example, an alkali metal element, such as Li, Na, and K, an alkaline earth metal element, such as Mg, and Ca, or the like.

As the Si-containing particle, the Si—C composite is preferably used. The Si—C composite is a particle that contains at least Si and C which are capable of reversibly storing and releasing the charge carrier (which might be a lithium ion in a lithium ion secondary battery). The Si—C composite might include an amorphous carbon coat on its surface. It is preferable, regarding the Si—C composite, that Si particles being microscopic more than the carbon particles are dispersed between the carbon particles. At the inside of the Si—C composite particle, there are a C domain and a Si domain, and it is preferable that an average diameter of the Si domain observed with a transmission electron microscope (TEM) is equal to or less than 50 nm. In addition, an average diameter of the Si domain might be, for example, equal to or more than 5 nm. Incidentally, an average value of the diameter of the Si domain means an arithmetical mean of diameters of at least 10 Si domains.

The Si—C composite can include a void at the inside. The Si particle can be dispersed in the void. It is suitable that a lower limit of an average value of the void rates is, for example, equal to or more than 5 vol %. An upper limit of the average value of the void rates can be, for example, equal to or less than 20 vol %. Incidentally, the void rate can be calculated with an image analyzing software (for example, ImageJ) by analyzing a scanning electron microscope (SEM) observation image of a cross section of the Si—C composite. In particular, it is possible to perform a binarization processing so as to make a solid phase portion of the observation image be drawn by white color and so as to make a gas phase portion (void) of the observation image be drawn by black color, and then to treat a rate of the black color portion with respect to the whole image as the void rate. Incidentally, the average value of the void rates means an arithmetical mean of the void rates of at least 5 observation images.

In a case where the total of Si—C composite is treated as 100 wt %, it is suitable that an oxygen content amount of the Si—C composite is, for example, equal to or less than 7 wt %. The oxygen content amount described above can be measured by an oxygen analyzing apparatus.

An average particle diameter ($D_{50}$) of the Si-containing particles is, for example, equal to or more than 2 μm and not more than 8 μm, or preferably equal to or more than 3 μm and not more than 5 μm. If the average particle diameter is within the above described range, a size of the Si-containing particle having swelled at an electrically charging time does not become too large, and thus it is possible to facilitate mitigating the stress at the swell time of the Si-containing particle.

As the binder, it is possible to use a conventionally known binder. As the binder, for example, it is possible to use carboxymethyl cellulose (CMC), poly acrylic acid (PAA), styrene butadiene rubber (SBR), polyvinylidene fluoride (PVDF), or the like. Among them, CMC, PAA, and SBR can be preferably used. In addition, combined use of CMC, PAA, and SBR is preferable.

The CMC is superior in a binding property, and contributes in enhancing the rigidity of the negative electrode 60. In a case where the negative electrode active material is treated as 100 parts by mass, a rate of CMC is preferably equal to or more than 0.3 parts by mass, or might be, for example, equal to or more than 0.5 parts by mass. By doing this, the rigidity of the negative electrode 60 can be suitably enhanced. The rate of CMC is preferably equal to or less than 4 parts by mass, is further preferably equal to or less than 3.5 parts by mass, or might be, for example, equal to or less than 3 parts by mass, equal to or less than 2.5, equal to or less than 2 parts by mass, or equal to or less than 1.5 parts by mass. By doing this, it is possible to suppress the rigidity of the negative electrode 60 from becoming excessively high.

The PAA is superior in a binding property with Si, and contributes in enhancing the rigidity of the negative electrode 60. In a case where the negative electrode active material is treated as 100 parts by mass, a rate of PAA is preferably equal to or more than 0.5 parts by mass, or further preferably equal to or more than 1 part by mass. By doing this, the rigidity of the negative electrode 60 can be enhanced suitably. The rate of PAA is preferably equal to or less than 5 parts by mass, is further preferably equal to or less than 4 parts by mass, or might be, for example, equal to or less than 3 parts by mass, or equal to or less than 2 parts by mass. By doing this, it is possible to suppress the rigidity of the negative electrode 60 from becoming excessively high.

The SBR is superior in an elastic property, more than CMC and PAA, and thus contributes in enhancing elongation easiness of the negative electrode 60. In a case where the negative electrode active material is treated as 100 parts by mass, the rate of SBR is preferably equal to or more than 0.5 parts by mass, further preferably equal to or more than 1 part by mass, or furthermore preferably equal to or more than 3 parts by mass. By doing this, it is possible to make the negative electrode 60 become easily elongated, and therefore it is possible to suitably mitigate the stress at the swell time of the negative electrode active material. As the result, it is possible to suitably suppress the swell of the negative electrode 60 caused by repeating charge and discharge. The rate of SBR is preferably equal to or less than 5 parts by mass, or might be equal to or less than 4 parts by mass. By doing this, the balance of the rigidity and elongation easiness of the negative electrode 60 can be suitably adjusted.

In a case where the negative electrode active material is treated as 100 parts by mass, a rate of a total of the binder is preferably, for example, equal to or more than 3 parts by mass, or might be, for example, equal to or more than 4 parts by mass, equal to or more than 5 parts by mass, or equal to or more than 6 parts by mass. By doing this, the rigidity of the negative electrode active material layer 64 can be suitably enhanced. The rate of the total of the binder is, for example, equal to or less than 10 parts by mass, is preferably equal to or less than 9 parts by mass, or might be equal to or less than 8.5 parts by mass. By doing this, it is possible to inhibit the rigidity of the negative electrode 60 from becoming excessively high, so as to suitably adjust the balance of the rigidity and elongation easiness.

In a case where the negative electrode active material is treated as 100 parts by mass, a rate of a total of CMC and PAA is, for example, equal to or more than 2 parts by mass, or might be equal to or more than 2.5 parts by mass, equal to or more than 3 parts by mass, or equal to or more than 3.5 parts by mass. By doing this, it is possible to suitably enhance the rigidity of the negative electrode 60. The rate of the total of CMC and PAA is, for example, equal to or less than 6 parts by mass, or might be equal to or less than 5.5 parts by mass, equal to or less than 5 parts by mass, or equal to or less than 4.5 parts by mass. By doing this, it is possible to inhibit the rigidity of the negative electrode 60 from becoming excessively high, so as to suitably adjust the balance of the rigidity and elongation easiness.

As the conductive material, it is possible to use a conventionally known one. As the conductive material, it is possible to use, for example, a carbon nanotube, such as single-walled carbon nanotube (SWCNT), double-walled carbon nanotube (DWCNT), and multi-walled carbon nanotube (MWCNT), a carbon black, such as acetylene black (AB), a carbon fiber, or the like. Among them, the carbon nanotube can be used preferably. Using the carbon nanotube can tend to suitably keep the electrically conductive path, and thus it is possible to suppress the reduction in a cycle capacity maintenance rate. It is possible to enhance the elongation easiness of the negative electrode 60.

In a case where the negative electrode active material is treated as 100 parts by mass, a rate of the conductive material is, for example, equal to or more than 0.01 parts by mass, or might be equal to or more than 0.05 parts by mass. In addition, the rate of the conductive material is equal to or less than 2 parts by mass, or might be equal to or less than 1 part by mass, equal to or less than 0.5 parts by mass, or, equal to or less than 0.2 parts by mass.

As the thickening agent, it is possible to use, for example, a cellulose type polymer, such as carboxymethyl cellulose (CMC), methyl cellulose (MC), cellulose acetate phthalate (CAP), and hydroxypropyl methyl cellulose (HPMC), polyvinyl alcohol (PVA), or the like.

A average thickness of the negative electrode active material layer 64 is preferably equal to or more than 100 μm and not more than 260 or further preferably equal to or more than 120 μm and not more than 200 μm. The average thickness of the negative electrode active material layer 64 can be an average value of thicknesses of at least 5 portions being selected randomly. Incidentally, the thickness of the negative electrode active material layer 64 means a thickness from the surface of the negative electrode collecting body 62.

A density of the negative electrode active material layer 64 is preferably equal to or more than 1.2 g/cm³ and not more than 1.7 g/cm³, or further preferably equal to or more than 1.45 g/cm³ and not more than 1.65 g/cm³. The density described above can be calculated by measuring a weight per a predetermined volume.

The negative electrode active material layer 64 includes a void at the inside. A void rate of the negative electrode active material layer 64 might be, for example, 20% to 35%. By making the void rate be as described above, it is possible to mitigate the swell stress of the negative electrode active material. The void rate of the negative electrode active material layer 64 can be measured by a mercury penetration method.

The rate of the negative electrode active material with respect to the whole negative electrode active material layer 64 is, which is not particularly restricted, for example, equal to or more than 80 mass %, preferably equal to or more than 90 mass %, or further preferably equal to or more than 95 mass %. In addition, the rate of the negative electrode active material with respect to the whole negative electrode active material layer 64 might be, which is not particularly restricted, for example, equal to or less than 98 mass %.

The negative electrode active material layer 64 can be formed by dispersing the negative electrode active material, the binder, and materials used as needed (conductive material, thickening agent, or the like) in a suitable solvent (for example, water), by preparing a paste like (or slurry like) composition (negative electrode mix paste), by applying a suitable amount of this composition onto a surface of the negative electrode collecting body 62 to coat, and by drying the resultant. In addition, it is possible by pressing to adjust a thickness and a density of the negative electrode active material layer 64.

The spring constant in the thickness direction of the negative electrode 60 (direction in which the negative electrode collecting body 62 and the negative electrode active material layer 64 are laminated) is, for example, equal to or more than 70 kN/m, is preferably equal to or more than 120 kN/m, or might be equal to or more than 150 kN/m, equal to or more than 180 kN/m, equal to or more than 220 kN/m, or equal to or more than 250 kN/m. By doing this, it is possible to suppress the swell and contraction caused by charge and discharge of the negative electrode active material. In addition, from the perspective of adjusting the balance of the rigidity and elongation easiness of the negative electrode 60, the spring constant described above is, for example, equal to or less than 400 kN/m, or might be equal to or less than 350 kN/m, or equal to or less than 300 kN/m.

Incidentally, the spring constant in the thickness direction of the negative electrode 60 can be measured, for example, with a commercially available compression testing machine. In particular, the compression testing machine is used to add a load from the thickness direction of the negative electrode 60, and then a two-dimensional plot (x-axis: displacement, y-axis: load) showing a relation between the load and a displacement of the thickness of the negative electrode with respect to this load is made. Then, it is possible, as the spring constant, to obtain an inclination of a straight line of plots in an area where the negative electrode 60 is elastically deformable.

Figure 3:
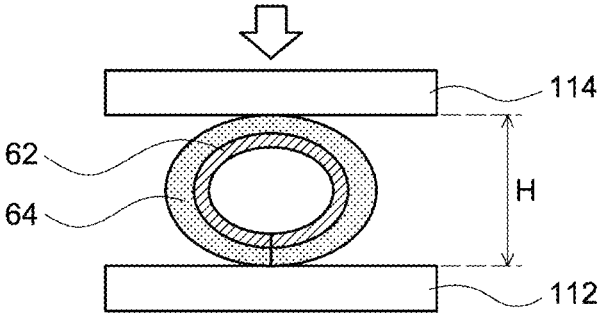
FIG. 3 is a schematic view that is for explaining a method of a stiffness test.
Figure 4:
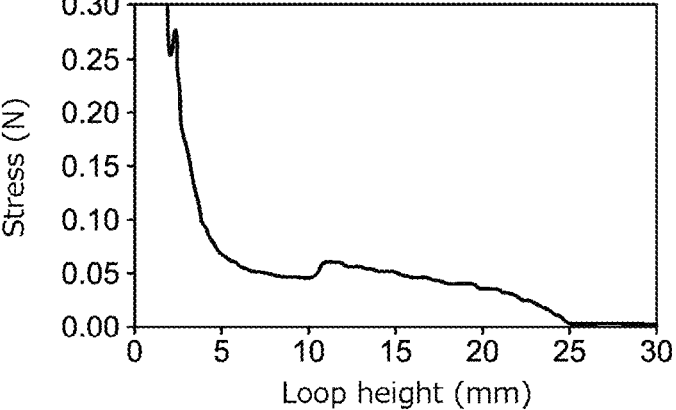
FIG. 4 is an example of a correlation graph for stresses and loop heights obtained by the stiffness test.

In order to mitigate the swell stress of the negative electrode active material caused by repeating charge and discharge, it is preferable that the negative electrode 60 has a property of being easily elongated. As an indicator for an elongation easiness of the negative electrode 60, it is possible to use a value of a yield loop height with a stiffness test. FIG. 3 is a schematic view that is for explaining a method of the stiffness test. In particular, at first, the sheet-shaped negative electrode 60 (negative electrode plate) is prepared which includes the negative electrode active material layer 64 on a single surface of the negative electrode collecting body 62, and the size is adjusted to be width 10 mm×length 80 mm. The both ends of the negative electrode 60 described above are butted while the negative electrode active material layer 64 is kept at the outside, so as to make the negative electrode be rounded in a single fold perfect circle form, and thus a loop-shaped sample whose outer circumference is 80 mm is manufactured. In addition, as an apparatus for the stiffness test, a pressurizing apparatus is prepared which includes a lower plate 112 being fixed and an upper plate 114 being opposed to the lower plate 112 and being movable in a vertical direction at an arbitrary speed. The sample described above is fixed to the lower plate 112 with the butted portion disposed at the lower plate 112 side, and the sample described above is sandwiched with the upper plate 114 in the vertical direction. The upper plate 114 is moved downward at a predetermined speed to press the outer circumference surface of the sample, and then the stress generated on the sample and a loop height H (distance between the upper plate 114 and the lower plate 112) of the sample on which the stress is generated is measured. The stress described above and the loop height H described above are shown in a graph, and then an inflexion point is obtained at which the stress substantially and continuously rises in response to the loop height becoming lower and then is firstly reduced. Then, the loop height H at the point where this inflexion point is confirmed is treated as the yield loop height. The yield loop height shows that the negative electrode is elongated more easily when the value of the yield loop height is smaller. FIG. 4 shows an example of a correlation graph for the stress and loop height on the stiffness test. In the example shown by FIG. 4, measuring the stress is started from a position whose loop height is about 25 mm, a point at the time when the loop height becomes 11 mm becomes the inflexion point, then the stress is steeply reduced. In other words, regarding the example described above, the yield loop height is 11 mm. Incidentally, the phrase "stress substantially and continuously rises" means a state where the stress continuously rises without considering stress reduction due to an error (noise) of the stress by the measuring equipment, or the like.

The yield loop height of the negative electrode 60 is, for example, equal to or less than 13 mm, is preferably equal to or less than 10 mm, is further preferably equal to or less than 8 mm, is furthermore preferably equal to or less than 6 mm, or might be equal to or less than 5 mm. By doing this, it is possible to suitably mitigate the stress at the swell time of the negative electrode active material. A lower limit of the yield loop height of the negative electrode 60 is, which is not particularly restricted, for example, equal to or more than 1 mm.

Above, a configuration of the negative electrode 60 and a configuration of the nonaqueous electrolyte secondary battery 100 in accordance with one embodiment are explained. The negative electrode 60 is suitably used for a nonaqueous electrolyte secondary battery, so as to implement the nonaqueous electrolyte secondary battery in which the swell of the negative electrode 60 and reduction in the capacity maintenance rate caused by repeating charge and discharge are decreased and in which a malfunction generated by repeating charge and discharge (for example, press to the other member by the negative electrode 60, reduction of the electrically conductive path in the negative electrode 60, or the like) can be suppressed. The nonaqueous electrolyte secondary battery 100 is available for various uses. The particular use of the nonaqueous electrolyte secondary battery might be for a portable power supply, such as personal computer, portable electronic equipment, and portable terminal; a power supply for driving automobiles, such as battery electric vehicle (BEV), hybrid electric vehicle (HEV), and plug-in hybrid electric vehicle (PHEV); a storage battery, such as small electric power storing apparatus; or the like, and among them, the power supply for driving automobiles is preferable. In addition, it is possible to use the nonaqueous electrolyte secondary battery 100 by connecting plural nonaqueous electrolyte secondary batteries in series and/or parallel so as to form a battery pack.

In addition, regarding the above described nonaqueous electrolyte secondary battery 100, the wound electrode assembly is illustrated as the electrode assembly 20, but the present disclosure is not limited to this illustration, and the electrode assembly might be, for example, a laminate electrode assembly in which plural plate-shaped positive electrodes and plural plate-shaped negative electrodes are alternately laminated via separators.

In addition, it is possible that the herein disclosed battery is configured as a coin-shaped battery, a button-shaped battery, a cylindrically-shaped battery, or a laminate-case-shaped battery. In addition, it is possible regarding the nonaqueous electrolyte that the herein disclosed battery is a polymer battery using a polymer electrolyte instead of the nonaqueous electrolyte, an all-solid battery using a solid electrolyte instead of the nonaqueous electrolyte, or the like.

While described above, as a particular aspect of the herein disclosed technique, it is possible to use a negative electrode described below at each item.

Item 1: A negative electrode for a nonaqueous electrolyte secondary battery, including: a current collector; and
    a negative electrode active material layer formed on a single surface or both surfaces of the current collector,
    wherein the negative electrode active material layer includes a negative electrode active material and a binder,
    the negative electrode active material comprises a graphite particle and a Si-containing particle,
    the binder comprises carboxymethyl cellulose (CMC), poly acrylic acid (PAA), and styrene butadiene rubber (SBR),
    a spring constant in a thickness direction of the negative electrode is equal to or more than 70 kN/mm and not more than 400 kN/mm, and
    on a correlation graph for a stress of a sample and a loop height of the sample which are obtained when an outer circumference surface of the sample is pressed, the sample with a 80 mm outer circumference being formed in a loop shape and being obtained by rounding a negative electrode plate in a single fold, the negative electrode plate including the negative electrode active material layer on a single surface of the current collector, to make the outer circumference surface become the negative electrode active material layer, a yield loop height is equal to or less than 13 mm, the yield loop height being the loop height corresponding to a first inflexion point at which the stress is reduced after being substantially and continuously risen.

Item 2: The negative electrode according to Item 1, wherein
    in a case where the negative electrode active material is treated as 100 parts by mass, a rate of the CMC is equal to or more than 0.3 parts by mass and not more than 4 parts by mass, a rate of the PAA is equal to or more than 0.5 parts by mass and not more than 5, and a rate of the SBR is equal to or more than 0.5 parts by mass and not more than 5 parts by mass.

Item 3: The negative electrode according to Item 1 or 2, wherein
    a rate of the SBR is equal to or more than 3 parts by mass and not more than 5 parts by mass.

Item 4: The negative electrode according to any one of Items 1 to 3, wherein
    in a case where the negative electrode active material is treated as 100 parts by mass, a rate of a total of the CMC and the PAA is equal to or more than 3.5 parts by mass and not more than 6 parts by mass.

Item 5: The negative electrode according to any one of Items 1 to 4, wherein
    the negative electrode active material layer further includes a carbon nanotube as a conductive material, and a rate of the carbon nanotube, in a case where the negative electrode active material is treated as 100 parts by mass, is equal to or more than 0.05 parts by mass and
not more than 1 part by mass.

Item 6: The negative electrode according to any one of
Items 1 to 5, wherein
the Si-containing particle is a Si—C composite.

Item 7: A nonaqueous electrolyte secondary battery,
including an electrode assembly
provided with a positive electrode and a negative elec-
trode, and including a nonaqueous electrolyte, wherein
the negative electrode is the negative electrode according
to any one of items 1 to 6.

Below, a test example related to the herein disclosed
technique is explained, but it is not intended to restrict the
herein disclosed technique to this test example.

Example 1

<Manufacture of Negative Electrode>

As the negative electrode active material, the graphite
particle (average particle diameter: 18 μm, average 10%
yield strength: 15 MPa, and BET specific surface area: 1.6
m$^2$/g) and the Si—C composite (average particle diameter:
3 μm) were prepared. In addition, as the conductive material,
a single-walled carbon nanotube (SWCNT) was prepared. In
addition, as the binder, a carboxymethyl cellulose (CMC), a
poly acrylic acid (PAA), and a styrene butadiene rubber
(SBR) were prepared. Based on a mass ratio, to implement
a mix ratio of graphite particle:Si—C composite:SWCNT:
CMC:PAA:SBR=90:10:0.1:1:1:1, substances were mixed
into water used as a solvent, and the resultant was kneaded
with a stirring granulator, so as to prepare a negative
electrode mix paste.

The prepared negative electrode mix paste was applied to
coat both surfaces of a copper foil whose thickness was 10
μm, and the resultant was dried. Then, press was performed
to have a predetermined thickness, and processing was
performed to be a predetermined size, so as to obtain the
negative electrode plate. Incidentally, a loaded volume per a
single surface of the negative electrode active material layer
was 220 g/m$^2$ (solid content reference), a thickness per the
single surface of the negative electrode active material layer
was 145 μm, and a filling density of the negative electrode
active material layer was 1.62 g/mL.

<Manufacture of Positive Electrode>

As the positive electrode active material, a lithium-nickel-
cobalt-manganese composite chemical compound
(LiNi$_{1/3}$Co$_{1/3}$Mn$_{1/3}$O$_2$, hereinafter referred to as "NCM")
was prepared. In addition, an acetylene black (AB) was
prepared as the conductive material, and a polyvinylidene
fluoride (PVDF) was prepared as the binder. Based on a
mass ratio, to implement a mix ratio of NCM:AB:
PVDF=100:1:1, and substances were mixed into N-methyl-
2-pyrrolidone (NMP) used as a solvent, so as to manufacture
the positive electrode mix paste.

The prepared positive electrode mix paste was applied to
coat both surfaces of an aluminum foil whose thickness was
15 μm, and the resultant was dried. Then, press was per-
formed to have a predetermined thickness, and processing
was performed to be a predetermined size, so as to obtain the
positive electrode plate.

<Manufacture of Test Battery>

The above-manufactured negative electrode plate and
positive electrode plate were laminated via the separator, so
as to manufacture the laminate electrode assembly. A lead
for electrical collection was attached to each of the positive
electrode plate and the negative electrode plate, and the
laminate electrode assembly was inserted to an outer package configured with an aluminum laminate sheet. The non-
aqueous electrolyte was injected to the inside of the outer
package, and then an opening part of the outer package was
sealed, so as to manufacture the test battery. Incidentally, as
the separator, a porous polyolefin sheet including a PP/PE/
PP three-layer structure was used. In addition, as for the
nonaqueous electrolyte, LiPF$_6$ was dissolved as a supporting
salt at a concentration of 1 mol/L into a mix solvent, in
which ethylene carbonate (EC), ethyl methyl carbonate
(EMC), and dimethyl carbonate (DMC) were mixed at
EC:EMC:DMC=20:40:40 based on a volume reference, and
then the resultant was used.

Examples 2 to 9

In Examples 2 to 9, the test batteries were manufactured
similarly to Example 1, other than making the rate of the
binder used for the negative electrode be different from
Example 1. Incidentally, the rate of the binder for each
example is as shown in Table 1.

<Evaluation of Cycle Capacity Maintenance Rate>

As performing CCCV electric charge (rate 0.4 C till 4.2
V, and then 0.1 C cut) and then CC electric discharge (rate
0.4 C, 2.5 V cut) under 25° C. environment was treated as
1 cycle, a cycle test was performed in which 300 cycle
charges and discharges were repeated. An electric discharge
capacity at the 1st cycle and an electric discharge capacity
at the 300th cycle were measured, and a cycle capacity
maintenance rate was obtained with Formula (1) described
below. The result is shown in Table 1.

$$\text{Cycle capacity maintenance rate (\%)} = ((\text{Electric discharge capacity at 300th cycle})/(\text{Electric discharge capacity at 1st cycle})) \times 100 \qquad \text{Formula (1)}$$

<Evaluation of Negative Electrode Swell Rate>

The test battery after the above described cycle test (in a
state where the electric discharge was performed to be 2.5 V)
was disassembled under an argon atmosphere, and soaked in
DMC, so as to wash the negative electrode plate. Then, the
negative electrode plate was dried, and then the thickness of
the negative electrode plate was measured. In addition, the
thickness of the negative electrode plate before the cycle test
was also measured similarly. An increasing rate of the
thickness of the negative electrode plate after the cycle test
with respect to the thickness of the negative electrode plate
before the cycle test was treated as the negative electrode
swell rate which was obtained with Formula (2) described
below. The result is shown in Table 1.

$$\text{Negative electrode swell rate (\%)} = ((\text{Negative electrode thickness after cycle test})/(\text{Negative electrode thickness before cycle test})-1) \times 100 \qquad \text{Formula (2)}$$

<Evaluation of Spring Constant of Negative Electrode>

The negative electrode plate before the cycle test was cut
to make the size of the cut negative electrode plate be 30
mm×41 mm, and 8 sheets of the negative electrode plates cut
to have this size were laminated, so as to manufacture the
sample for evaluation. A load was added on this evaluation
sample in a laminate direction with a precise universal
testing machine (made by Shimadzu Corporation). By mak-
ing a graph, in which the load (kN) at that time was put on
the y-axis and the displacement (mm) in the laminate
direction of the evaluation sample with respect to this load
was put on the x-axis, and by obtaining the inclination of this
graph, the spring constant (kN/mm) in the thickness direc-
tion of the negative electrode was obtained. The result is
shown in Table 1.

<Stiffness Test>

In order to evaluate the elongation easiness of the negative electrode plate, the stiffness test was performed. At first, the negative electrode active material layer on the single surface of the negative electrode plate before the cycle test was removed, and cutting out was performed to have a size of width 10 mm×length 80 mm, so as to prepare the negative electrode plate including the negative electrode active material layer on the single surface. The negative electrode plate described above was rounded in a single fold to have a perfect circle form by butting the both ends to make the negative electrode active material layer be disposed at the outside, so as to manufacture the loop-shaped sample whose outer circumference was 80 mm. In addition, as a stiffness test apparatus, a pressurizing apparatus was prepared which included a lower plate being fixed and an upper plate being opposed to the lower plate and being able to move in a vertical direction at an arbitrary speed. The sample described above was fixed to the lower plate to make the butted portion be disposed at the lower plate side, and the sample was sandwiched in the vertical direction by the upper plate. The upper plate was moved downward at a speed of 100 mm/minute, so as to press the outer circumference surface of the sample. At that time, the stress generated on the sample and the loop height of the sample, at the time when the stress was generated, were measured. Then, the correlation graph for the above described stress and the above described loop height was made, and the inflexion point was obtained at which the stress was substantially and continuously risen with response to the loop height becoming lower and then was firstly reduced. The loop height corresponding to this inflexion point is treated as the yield loop height and shown in Table 1.

Above, about the herein disclosed technique, the specific examples have been explained in detail, but these are merely illustrative, and thus are not construed as limiting the scope of the appended claims. The herein disclosed technique contains contents in which the above described specific examples are variously deformed or changed.

What is claimed is:

1. A negative electrode for a nonaqueous electrolyte secondary battery, comprising:

a current collector; and a negative electrode active material layer disposed on a single surface or both surfaces of the current collector, wherein the negative electrode active material layer comprises a negative electrode active material and a binder, the negative electrode active material comprises graphite particles and Si-containing particles, the binder comprises carboxymethyl cellulose (CMC), poly acrylic acid (PAA), and styrene butadiene rubber (SBR), a spring constant in a thickness direction of the negative electrode is equal to or more than 70 kN/mm and not more than 150 kN/mm, and on a correlation graph for a stress of a sample and a loop height of the sample which are obtained when an outer circumference surface of the sample is pressed, the sample with a 80 mm outer circumference being formed in a loop shape and being obtained by rounding a negative electrode plate in a single fold, the negative electrode plate comprising the negative electrode active material layer on a single surface of the current collector, to make the outer circumference surface become the negative electrode active material layer, a yield loop

TABLE 1

| | Binder rate (parts by mass) | | | Spring constant | Yield loop height | Negative electrode swell rate | Cycle capacity maintainance rate |
|---|---|---|---|---|---|---|---|
| | CMC | PAA | SBR | (kN/mm) | (mm) | (%) | (%) |
| Example 1 | 1 | 1 | 1 | 120 | 10 | 20 | 92 |
| Example 2 | 1 | 1 | 4 | 150 | 5 | 19 | 93 |
| Example 3 | 1.2 | 1.5 | 1 | 180 | 13 | 18 | 90 |
| Example 4 | 3.5 | 2 | 3 | 250 | 8 | 14 | 87 |
| Example 5 | 0.3 | 4 | 3 | 270 | 6 | 13 | 95 |
| Example 6 | 1 | 0 | 1 | 50 | 15 | 30 | 80 |
| Example 7 | 1 | 1 | 0.4 | 112 | 14 | 22 | 82 |
| Example 8 | 5 | 1.5 | 0.5 | 250 | 15 | 15 | 81 |
| Example 9 | 0.7 | 0.3 | 1 | 60 | 10 | 30 | 91 |

As shown in Table 1, regarding Examples 1 to 5 and 8 in which the spring constants (rigidities) were comparatively high, the negative electrode swell rates were decreased more than Examples 6, 7, and 9 in which the spring constants were comparatively low. However, regarding Example 8, the cycle capacity maintenance rate was lower than Examples 1 to 5. Regarding this result, it is thought that the negative electrode in Example 8 had a high value of the yield loop height and had insufficient elongation easiness, and thus that mitigation of the stress at the swell was insufficient. On the other hand, it is understood that the negative electrodes in Examples 1 to 5 had the low yield loop heights and had properties of being easily elongated, and thus that the outstanding capacity maintenance rate in addition to the decrease in the negative electrode swell rate was also implemented.

height is equal to or less than 13 mm, the yield loop height being the loop height corresponding to a first inflexion point at which the stress is reduced after being substantially and continuously risen.

2. The negative electrode according to claim 1, wherein the negative electrode active material includes:

0.3 to 4 parts by mass of the CMC, 0.5 to 5 parts by mass of the PAA, and 0.5 to 5 parts by mass of the SBR, relative to 100 parts by mass of the negative electrode active material.

3. The negative electrode according to claim 1, wherein the negative electrode active material includes 3 to 5 parts by mass of the SBR, relative to 100 parts by mass of the negative electrode active material.

4. The negative electrode according to claim 3, wherein the negative electrode active material includes a total of 3.5 to 6 parts by mass of the CMC and the PAA, relative to 100 parts by mass of the negative electrode active material.

5. The negative electrode according to claim 1, wherein the negative electrode active material layer further comprises carbon nanotubes as a conductive material, and the negative electrode active material includes 0.05 to 1 part by mass of the carbon nanotubes, relative to 100 parts by mass of the negative electrode active material.

6. The negative electrode according to claim 1, wherein the Si-containing particles include a Si—C composite.

7. A nonaqueous electrolyte secondary battery, comprising:

an electrode assembly provided with a positive electrode and a negative electrode, and a nonaqueous electrolyte, wherein the negative electrode is the negative electrode according to claim 1.

8. The negative electrode according to claim 1, wherein the negative electrode active material includes 3 to 5 parts by mass of the SBR, relative to 100 parts by mass of the negative electrode active material.

9. The negative electrode according to claim 1, wherein a ratio of a total mass of the CMC and PAA to a mass of SBR is 0.5 or more and 2 or less.

\* \* \* \* \*